United States Patent Office 3,376,252
Patented Apr. 2, 1968

3,376,252
URETHANE COATING COMPOSITIONS
Donald L. Peiser and Donald B. Parrish, Lake Jackson, Tex., assignors to The Dow Chemical Company, Midland, Mich., a corporation of Delaware
No Drawing. Filed May 27, 1965, Ser. No. 459,416
8 Claims. (Cl. 260—45.7)

ABSTRACT OF THE DISCLOSURE

Moisture curable urethane coating compositions are rendered stable to deteriorating and/or gelling by incorporation of 2,2-dimethoxypropane.

---

This invention concerns urethane coating compositions and pertains especially to liquid urethane coating compositions containing an anti-gelling or stabilizing agent.

It is known to prepare polyester-diisocyanate reaction products capable of curing to a solid condition in moist air at elevated temperatures to form tough, rubbery coatings. For example, U.S. Patent No. 2,721,811 makes rubbery polyurethane elastomer coatings on nylon.

Urethane coatings or varnishes comprising solutions of curable urethane polymers dissolved in a volatile organic solvent are known and are useful for a variety of purposes in the home and industry. However, such solutions or varnishes are oftentimes not as resistant to gelling or are not as stable against deteriorating upon prolonged storage as is desired.

It has now been discovered that moisture curable urethane coating compositions or varnishes can readily be rendered stable or extremely resistant to deteriorating and/or gelling upon storing for prolonged periods of times by incorporating into the liquid coating composition or varnish a small but effective amount within the range of from 1 to 25, preferably from 5 to 10, percent by weight of ketal, i.e., 2,-dimethoxypropane.

The stabilized moisture curable urethane coating compositions can be stored for prolonged periods of time, e.g., in sealed cans or drums, with little or no tendency toward gelling. Such cans or drums of the material can be opened and a portion of the material removed or be used, after which the can or drum can be resealed or closed and stored with little or no change in the stability of the remaining portion of the composition.

The urethane coatings to be stabilized with the 2,2-dimethoxypropane are the moisture curable reaction products of a polyisocyanate with a polyether polyol, hydroxyl-containing polyesters, or hydroxyl-containing acrylate polymers, which reaction products are soluble in organic solvents such as benzene, toluene, xylene, or monoesters of ethylene glycol or propylene glycol such as hydroxyethyl acetate, hydroxypropyl acetate, hydroxypropyl propionate, hydroxyethyl propionate or mixtures of such aromatic hydrocarbon and hydroxyalkyl esters.

Examples of suitable hydroxyl-containing starting materials are polypropylene glycols having an average molecular weight of from 1200 to 4000, homopolymers and copolymers consisting of one or more hydroxy alkyl esters having the general formula:

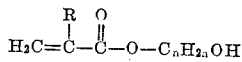

wherein R is a member of the group consisting of hydrogen and the methyl radical and $n$ is a whole number from 2 to 3, in chemically combined form, which polymer has an average molecular weight between about 15,000 and 30,000, copolymers of at least 20 percent by weight of at least one such hydroxyalkyl ester having the above general formula and up to 80 percent by weight of at least one monomer selected from the group consisting of vinyl aromatic hydrocarbons having the general formula:

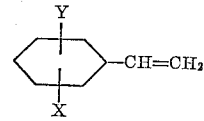

wherein X and Y each represents a member of the group consisting of hydrogen and alkyl radicals having from 1 to 4 carbon atoms, acrylic and methacrylic acid esters having the formula:

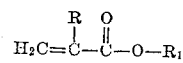

wherein R is hydrogen or the methyl group and $R_1$ is alkyl having from 1 to 8 carbons, and acrylonitrile, or mixtures thereof, said polymers having an average molecular weight between 15,000 and 30,000.

The following examples illustrate ways in which the principle of the invention has been applied but are not to be construed as limiting its scope.

EXAMPLE 1

A mixture of 1440 grams of polypropylene glycol having an average molecular weight of 1200, and 320 grams of tris(hydroxypropyl)glycerine, together with 600 grams of xylene, 780 grams of Cellosolve acetate, 300 grams of benzene and 6 grams of 2,6-di-tert.-butyl-4-methyl phenol as antioxidant were placed in a glass reaction flask equipped with a short distilling column. The mixture was heated to boiling and 300 grams of volatile materials were distilled therefrom to azeotropically remove water. The dried liquid residue was cooled to 55° C. and was placed in a reaction vessel equipped with a stirrer, reflux condenser and dropping funnel. It was stirred and 83.5 grams of tolylene diisocyanate was slowly added thereto. Thereafter, the mixture was stirred and was heated at a temperature of 91° C. for a period of 3 hours, then was cooled and 26 grams of 2-hydroxy-4-octoxybenzophenone, and 13 grams of dilauryl thiodipropionate, as ultraviolet light absorber and antioxidant, respectfully were added. The product was a solution of the soluble linear polyurethane dissolved in the organic solvents. A charge of 95 grams of the polyurethane solution was mixed with 5 grams of 2,2-dimethoxypropane and was sealed in a stoppered bottle. One bottle was stored at room temperature. Another portion of the mixture was heated in a bottle in an oven at a temperature of 55° C. In each test a portion of the polyurethane solution without the 2,2-dimethoxypropane was stored under similar conditions as a blank. The polyurethane solutions containing the 2,2-dimethoxypropane were free from gel after storing for 105 days at room temperature, and after being heated at 55° C. for 105 days. In contrast, the polyurethane solutions without 2,2-dimethoxypropane gelled in 15 days at 55° C., and was a gel in 63 days when stored at room temperature.

Similar stabilizing results were obtained when 10, 15, 20 and 25 parts of 2,2-dimethoxypropane were mixed with 90, 85, 80 and 75 parts of the polyurethane solution.

EXAMPLE 2

A charge of 200 grams of Cellosolve acetate (2-hydroxyethyl acetate) as solvent and reaction medium, containing 0.5 gram of azobisisobutyronitrile as polymerization catalyst, was placed in a glass reaction vessel equipped with a reflux condenser and stirrer. The mixture was stirred and heated to 80° C. A mixture of 136.4 grams of isobutyl acrylate, 40 grams of styrene, 40 grams of acrylonitrile and 23.2 grams of 2-hydroxy ethyl acrylate, together with 4 grams of tertiary $C_{10}$–$C_{12}$ mercaptans and 0.5 gram of azobisisobutyronitrile was added slowly over a period of 1.5 hours with stirring. The resulting mixture was stirred and heated at 80° C. for 5 hours longer, then was cooled to room temperature. It was a light yellow-colored viscous liquid. To the mixture was added 100 ml. of xylene and 100 ml. of benzene. The resulting mixture was heated to distill about 100 ml. of material and azeotropically dry the solution. The residue was stirred and cooled to 55° C. A charge of 38.3 grams of tolylene diisocyanate was added dropwise with stirring, after which stirring and heating at 55° C. was continued for 5 hours longer, then the mixture was cooled. the product was a solution of a soluble urethane polymer. The polymer upon evaporating the solvent therefrom was capable of being cured by moisture to an insoluble infusible state. In a test to determine the stability of the solution, a charge of 100 grams of the solution was stored in a stoppered bottle at room temperature. The solution gelled after standing for 6 days. A mixture of 100 grams of the solution and 20 grams of 2,2-dimethoxypropane was stored in a stoppered bottle at room temperature. It was a free flowing liquid after storing for 60 days.

EXAMPLE 3

A mixture of 225 grams of hydroxyethyl acrylate and 1275 grams of methyl methacrylate was copolymerized in admixture with 642 grams of xylene and 15 grams of azobisisobutyronitrile and 30 grams of tertiary $C_{10}$–$C_{12}$ mercaptans, to form a copolymer having an average molecular weight of 27,000, employing procedure similar to that employed in Example 2, to form a solution of the copolymer.

A charge of 414 grams of the copolymer solution was placed in a reaction vessel together with 150 grams of Cellosolve acetate and 150 grams of benzene. The solution was stirred and 45.6 grams of tolylene diisocyanate was added slowly over a period of about two hours while stirring and heating the resulting mixture at a temperature of about 55° C. The product was a solution of a moisture-curable urethane polymer composition in the organic solvents. A charge of 100 grams of the solution was stored in a stoppered glass bottle at room temperature. It gelled in 10 days. A charge of 100 grams of the solution mixed with 20 grams of 2,2-dimethoxyporpane was stored at room temperature in a stoppered glass bottle. It gelled in 38 days.

EXAMPLE 4

A mixture of 69.6 grams of hydroxyethyl acrylate, 350.4 grams of isobutyl acrylate and 180 grams of acrylonitrile were copolymerized in 600 grams of Cellosolve acetate in admixture with 3 grams of azobisisobutyronitrile as catalyst and 12 grams of tertiary $C_{10}$–$C_{12}$ mercaptans, to form a copolymer having an average molecular weight of 23,000, employing procedure similar to that employed in Example 2, to form a solution of the copolymer. A charge of 400 grams of the solution of the polymer, 150 grams of Cellosolve acetate, 100 grams of benzene was stirred and heated at a temperature of 55° C. while adding 35 grams of tolylene diisocyanate thereto over a period of about one hour. The product was a moisture-curable urethane polymer composition. A charge of 100 grams of the solution of the polymer composition was mixed with 10 grams of 2,2-dimethoxypropane and was stored in a stoppered glass bottle at room temperature. It gelled after standing for 100 days. In the absence of the 2,2-dimethoxypropane stabilizing agent, the solution of the polymer composition gelled when stored at room temperature for a period of 6 days.

EXAMPLE 5

A mixture of 261 grams of 2-hydroxyethyl acrylate and 1539 grams of isobutyl acrylate were copolymerized in 1800 grams of Cellosolve acetate in admixture with 9 grams of azobisisobutyronitrile and 36 grams of tertiary $C_{10}$–$C_{12}$ mercaptans, to form a copolymer having an an average molecular weight of 15,000, to form a solution of the copolymer employing procedure similar to that employed in Example 2. A charge of 400 grams of the solution of the copolymer was mixed with 100 grams of xylene and 100 grams of benzene and was reacted with 43.5 grams of tolylene diisocyanate at a temperature of 55° C. The product was a solution of a moisture-curable urethane polymer composition. A charge of 100 grams of the solution of the polymer composition was sealed in a stoppered glass bottle and placed in an oven at 55° C. It gelled in 2 days. A charge of 90 grams of the solution of the polymer mixed with 10 grams of 2,2-dimethoxypropane was free from gel after heating in the oven at 55° C. for 24 days.

EXAMPLE 6

A mixture of 78 grams of hydroxyethyl methacrylate, 282 grams of isobutyl acrylate 120 grams of acrylonitrile and 120 grams of styrene, was copolymerized in 600 grams of Cellosolve acetate as solvent and reaction medium in admixture with 3 grams of azobisisobutyronitrile and 12 grams of teriary $C_{10}$–$C_{12}$ mercaptans, to form a copolymer having an average molecular weight of 26,000, to form a solution of the copolymer, employing procedure similar to that employed in Example 2. A charge of 400 grams of the solution to the copolymer was mixed with 100 grams of xylene and 100 grams of benzene and was reacted with 35 grams of tolylene diisocyanate by heating the mixture at 55° C. The product was a solution of a moisture-curable urethane polymer composition. A mixture of 100 grams of the solution of the polymer composition and 10 grams of 2,2-dimethoxypropane was stored in a stoppered glass bottle at room temperature. It was gelled after 7 days.

EXAMPLE 7

A mixture of 208.8 grams of 2-hydroxyethyl acrylate 871.2 grams of isobutyl acrylate 360 grams of acrylonitrile and 360 grams of styrene was copolymerized in 1800 grams of Cellosolve acetate in admixture with 9 grams of azobisisobutyronitrile and 36 grams of tertiary $C_{10}$–$C_{12}$ mercaptans to form a solution of the copolymer having an average molecular weight of 25,000, employing procedure similar to that employed in Example 2. A charge of 200 grams of the solution of the copolymer was mixed with 50 grams of xylene and 100 grams of benzene and was reacted with 19.4 grams of 1,4-cyclohexane bismethylisocyanate at a temperature of 55° C. The product was a solution of a moisture-curable urethane polymer composition. A mixture of 100 grams of the solution of the polymer composition and 15 grams of 2,2-dimethoxypropane was stored in a stoppered glass bottle at room temperature. It was gelled in 29 days. In the absence of the 2,2-dimethoxypropane, the solution of the polymer composition gelled in 6 days.

Similar results were obtained when 1,6-hexane diisocyanate was used in place of the 1,4-cyclohexane bismethyl isocyanate used in the example.

We claim:
1. A urethane coating composition comprising a solution of a curable urethane resin dissolved in an organic solvent, said solution containing from 1 to 25 parts by weight of 2,2-dimethoxypropane per 100 parts by weight of the urethane resin.

2. A composition as claimed in claim 1, wherein the urethane resin is the reaction product of tolylene diisocyanate and polypropylene glycol having a molecular weight between 1200 and 4000.

3. A composition as claimed in claim 1, wherein the urethane resin is the reaction product of tolylene diisocyanate and a polymer selected from the group consisting of homopolymers and copolymers consisting only of at least one chemically combined hydroxyalkyl acrylate monomer having the general formula:

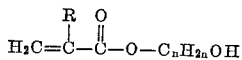

wherein R is a member of the group consisting of hydrogen and the methyl radical and $n$ is a whole number from 2 to 3.

4. A comoposition as claimed in claim 1, wherein the urethane resin is the reaction product of tolylene diisocyanate and a copolymer of at least 20 percent by weight of a hydroxyalkyl acrylate monomer and having the general formula:

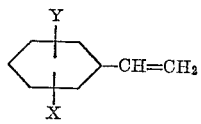

wherein R is a member of the group consisting of hydrogen and the methyl radical and $n$ is a whole number from 2 to 3 and up to 80 percent by weight of at least one other monomer selected from the group consisting of vinyl aromatic hydrocarbons having the general formula:

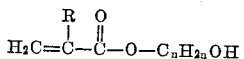

wherein X and Y each represents a member of the group consisting of hydrogen and alkyl radicals having from 1 to 4 carbons, alkyl acrylate monomers having the general formula:

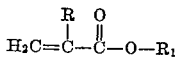

wherein R is a member of the group consisting of hydrogen and the methyl radical and $R_1$ is an alkyl radical having from 1 to 8 carbons, and acrylonitrile.

5. A composition as claimed in claim 4, wherein the copolymer is a copolymer of the hydroxyalkyl acrylate monomer and an alkyl acrylate monomer.

6. A composition as claimed in claim 4, wherein the copolymer is a copolymer of the hydroxyalkyl acrylate monomer and acrylonitrile.

7. A composition as claimed in claim 4, wherein the copolymer is a copolymer of the hydroxyalkyl acrylate monomer, an alkyl acrylate monomer and styrene.

8. A composition as claimed in claim 4, wherein the copolymer is a copolymer of the hydroxyalkyl acrylate monomer, an alkyl acrylate monomer, acrylonitrile and styrene.

References Cited

UNITED STATES PATENTS

| | | | |
|---|---|---|---|
| 2,716,095 | 8/1955 | Stanton et al. | 260—45.7 |
| 3,200,099 | 8/1965 | Lewis et al. | 260—32.2 XR |
| 3,245,941 | 4/1966 | Mayer et al. | 260—33.6 XR |

DONALD E. CZAJA, *Primary Examiner.*

M. J. WELSH, *Assistant Examiner.*